(12) United States Patent
Scott et al.

(10) Patent No.: US 7,907,262 B2
(45) Date of Patent: Mar. 15, 2011

(54) SURFACE SHAPE MEASUREMENT APPARATUS AND METHOD

(75) Inventors: Andrew M Scott, Malvern (GB); Andrew C Lewin, Malvern (GB)

(73) Assignee: QinetiQ Limited, London (GB)

( * ) Notice: Subject to any disclaimer, the term of this patent is extended or adjusted under 35 U.S.C. 154(b) by 255 days.

(21) Appl. No.: 10/589,075

(22) PCT Filed: Feb. 10, 2005

(86) PCT No.: PCT/GB2005/000455
§ 371 (c)(1),
(2), (4) Date: Aug. 11, 2006

(87) PCT Pub. No.: WO2005/078385
PCT Pub. Date: Aug. 25, 2005

(65) Prior Publication Data
US 2007/0165242 A1    Jul. 19, 2007

(30) Foreign Application Priority Data
Feb. 11, 2004  (GB) .................................. 0402941.9

(51) Int. Cl.
*G01B 9/00* (2006.01)
(52) U.S. Cl. .......................................... 356/124; 356/601
(58) Field of Classification Search .................. 356/512, 356/511, 515, 124–127
See application file for complete search history.

(56) References Cited

U.S. PATENT DOCUMENTS

| | | | |
|---|---|---|---|
| 4,643,576 A | * | 2/1987 | Kanoh et al. .................. 356/513 |
| 5,062,702 A | * | 11/1991 | Bille .............................. 351/212 |
| 5,581,347 A | | 12/1996 | Le Saux et al. |
| 5,675,413 A | * | 10/1997 | Prikryl et al. .................. 356/508 |
| 5,737,079 A | * | 4/1998 | Burge et al. ................... 356/513 |
| 6,344,898 B1 | | 2/2002 | Gemma et al. |
| 6,750,958 B1 | | 6/2004 | Fantone et al. |
| 2002/0159030 A1 | * | 10/2002 | Frey et al. ...................... 351/212 |

(Continued)

FOREIGN PATENT DOCUMENTS

DE    3531904 A1    3/1986

(Continued)

OTHER PUBLICATIONS

International Search Report of PCT/GB2005/000455, mailed Jul. 7, 2005.

(Continued)

*Primary Examiner* — Tarifur Chowdhury
*Assistant Examiner* — Michael LaPage
(74) *Attorney, Agent, or Firm* — Nixon & Vanderhye P.C.

(57) ABSTRACT

Apparatus for indicating the departure of a shape of an object from a specified shape is described. The apparatus includes a light source for directing an incident beam of radiation onto the object, and an inspecting device for inspecting the final beam after transmission by or reflection from the object. The apparatus is arranged so that the final beam will have a substantially planar wavefront when the object has the specified shape, and said inspecting device is arranged to determine any departure of the wavefront of the final beam from planarity. In one embodiment, the inspecting device includes a beamsplitter, for example a diffraction grating or hologram, and a detector such as a CCD camera. The beamsplitter is then arranged to split the final beam into two or more beams and to direct the two or more beams to laterally displaced locations on the detector.

18 Claims, 5 Drawing Sheets

U.S. PATENT DOCUMENTS

Figure 1:
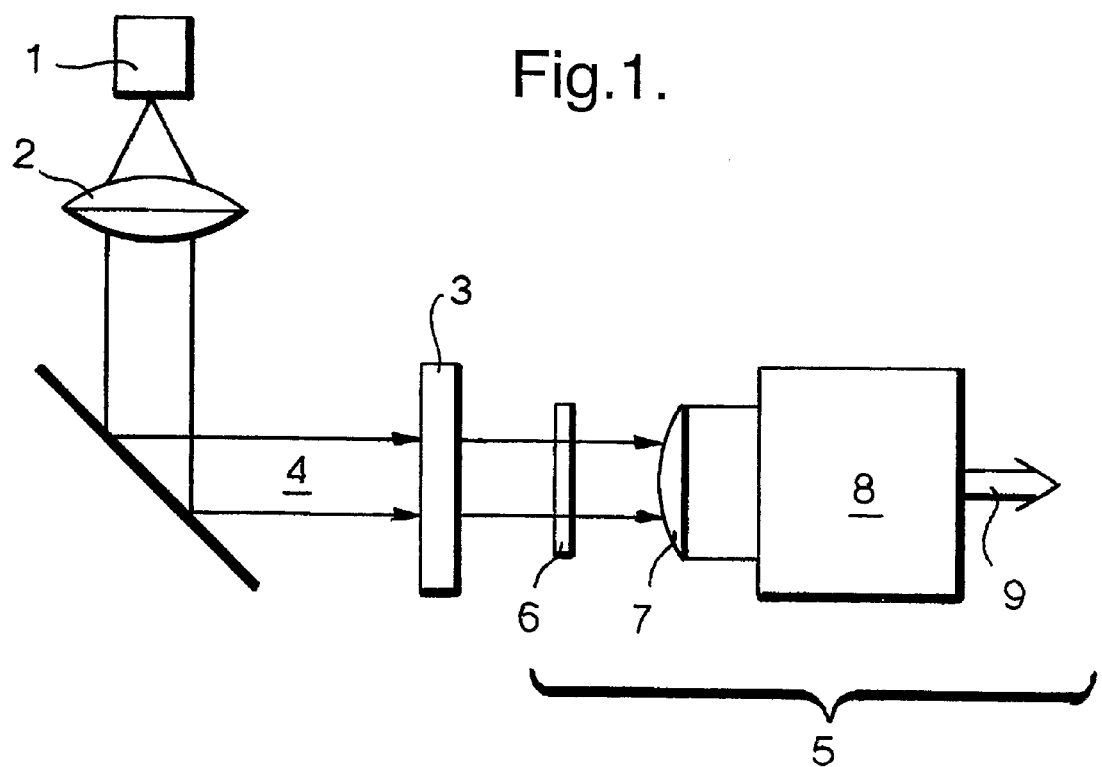

| | | | |
|---|---|---|---|
| 2002/0176090 A1* | 11/2002 | Ohsaki et al. | 356/512 |
| 2003/0002048 A1* | 1/2003 | Zanoni | 356/512 |
| 2003/0058433 A1* | 3/2003 | Almogy et al. | 356/237.1 |
| 2003/0112426 A1* | 6/2003 | Devie et al. | 356/124 |
| 2003/0128368 A1* | 7/2003 | Kuchel | 356/512 |

FOREIGN PATENT DOCUMENTS

| | | |
|---|---|---|
| JP | 05-146406 | 6/1993 |
| JP | 07-229721 | 8/1995 |
| JP | 2000-227313 | 8/2000 |
| JP | 2003-322587 | 11/2003 |
| JP | 2004-029076 | 1/2004 |
| WO | 03/044455 A1 | 5/2003 |
| WO | WO 03/044456 | 5/2003 |
| WO | WO 03/074985 | 9/2003 |

OTHER PUBLICATIONS

GB Search Report of GB0402941.9, dated Jul. 15, 2004.
English translation of Japanese Notice of Rejection (Official Action) mailed Jul. 20, 2010 for JP 2006-552680.

* cited by examiner

SURFACE SHAPE MEASUREMENT APPARATUS AND METHOD

This application is the US national phase of international application PCT/GB2005/000455, filed 10 Feb. 2005, which designated the U.S. and claims priority of GB 0402941.9, filed 11 Feb. 2004, the entire contents of each of which are hereby incorporated by reference.

The present invention relates to an apparatus and method for the determination of departures in a shape associated with an object from a specified shape.

International Patent Application No. WO99/46768 (Secretary of State for Defence) describes an imaging system which includes a diffraction grating which is distorted substantially according to a quadratic function to cause images to be formed under varying focus conditions.

Our copending International Patent Application No. WO03/074985 describes and claims measuring apparatus (and a related method) for determining data relating to the local shape (or distribution of local phase) of a radiation wavefront arriving at a pupil plane, wherein said shape is defined by a set of predetermined orthonormal functions, each function being provided with a weighting coefficient for determining the shape, said data comprising at least one said weighting coefficient, the apparatus comprising a said input pupil, rate means responsive to said radiation for determining a pixelwise distribution indicative of rate of radiation intensity change as the radiation traverses the input pupil, and converting means for converting said intensity distribution to said data, wherein said converting means comprises a store holding one or more matrices of predetermined values, each said matrix corresponding to one said orthonormal function, and the size of each said matrix corresponding to the number of pixels in said pixelwise distribution, and calculating means for multiplying said pixelwise distribution by a said matrix and adding the results to provide said weighting coefficient for its said orthonormal function.

Our copending International Patent Application No. WO03/074984 describes and claims optical apparatus for use in determining data relating to the wavefront of radiation arriving at a main pupil plane of the apparatus, wherein said wavefront is defined by a set of weighted predetermined orthonormal functions, the weighting coefficients being a function of the shape of the wavefront, the apparatus comprising first mask means for providing a first grey-scale transmission mask determined by a said function at a first location adjacent an incident side of a first pupil plane, and second mask means for providing a second grey-scale transmission mask determined by the same said function at a second location adjacent the side of a second pupil plane opposed to the incident side.

In the latter two copending applications, certain embodiments of the apparatus comprise a distorted diffraction grating of the type generally described in the aforesaid International Patent Application No. WO99/46768, or a hologram (with or without a supplementary lens) in lieu of the distorted grating.

Our copending International Patent Application No. WO04/068090 relates to related arrangements where a non-diffractive arrangement may replace the distorted diffraction grating. This provides optical apparatus for simultaneously focussing first and second coaxially spaced object planes in respective separate first and second areas of a common image plane, the apparatus comprising non-diffractive beamsplitter means for receiving light from said object planes along a common path for transmission to said first and second image areas along respective first and second optical paths, and focussing means arranged to bring said first and second object planes into focus in said first and second areas.

The type of apparatus disclosed in these copending applications is particularly useful where the wavefronts are nominally flat or slightly curved, and so it can find applications in (for example) detecting distortions in wavefronts from distant sources or objects. However, as the wavefront exhibits an increasingly significant degree of curvature the determination of the wavefront shape and/or distortions from a nominal wavefront shape (e.g. spherical or cylindrical) becomes increasingly difficult or unreliable.

It is well known to examine an object by directing a radiation beam thereon and inspecting the resulting radiation beam. For example, U.S. Pat. No. 6,344,898 describes interferometric apparatus in which radiation having a spherical wavefront is used to analyse the shape of a reflective aspherical object. However, in a large number of cases (such as U.S. Pat. No. 6,344,898) the wavefront of the resulting beam is significantly non-planar. It is now appreciated that it is possible to provide where necessary wavefront shaping means for distorting the beam wavefront before and/or after it has encountered an object having a specified shape SQ that the final beam should have a generally planar wavefront for an object, making it possible to inspect the final beam wavefront for planarity and to derive an indication of any departures in shape from the specified shape.

While the invention encompasses the use of any known method for inspecting wavefront planarity, in a series of preferred embodiments of the invention this is performed by employing apparatus of the type disclosed in our aforesaid copending patent applications.

In a first aspect the present invention provides apparatus for indicating the departure in a shape associated with an object from a specified shape, the apparatus comprising radiation means for directing an incident beam of radiation onto the object, and inspecting means for inspecting a final beam following transmission by or reflection from said object, wherein the apparatus is arranged so that the final beam will have a substantially planar wavefront when said object has said specified shape, and said inspecting means is arranged to determine any departure of the wavefront of the final beam from planarity, characterised in that said inspecting means comprises beamsplitting means (e.g. a diffraction grating or hologram) and detector means (e.g. a CCD camera) wherein the beamsplitting means is arranged to split the final beam into two or more beams and to direct said two or more beams to laterally displaced locations on the detector means. The inspecting means of this first aspect of the invention may thus employ a wavefront sensor of the type described in our aforesaid patent applications.

Where only transmission by the object is involved, the associated shape may be the overall shape of the transmissive body of the object, e.g. as determined by the shape of both curved surfaces of a bi-convex or bi-concave optically transparent lens.

Where only reflection by a surface of the object is involved, e.g. the front reflective surface of a convex or concave reflective element, the associated shape may be the shape of that surface.

Where both transmission and reflection are involved, e.g. as in a mirror with a rear reflective surface, the associated shape may encompass not only the shape of the reflective surface but the shape of the material lying over the reflective surface. Where the reflective surface is known to be perfectly planar, the associated shape will be only that of the overlying transmissive material.

It should be noted that the foregoing assumes that the radiation transmissive material is homogeneous. Clearly any variations in property of the material, for example due to strain or uneven composition will also alter the shape of the final wavefront.

A beam with a substantially planar wavefront is substantially collimated. The intensity distribution across the beam is not necessarily uniform however. Commonly, the radiation means comprises means for forming a collimated radiation beam, so that when the object is of the specified shape the collimated illuminating radiation is converted to collimated reflected or transmitted radiation.

In one form of apparatus according to the invention, where the object has a specified shape which does not affect the wavefront shape significantly, for example a plane mirror or a thin transmissive sheet of material, then it is possible to employ a substantially collimated incident radiation beam (i.e. having a substantially planar wavefront) and to inspect the resulting generally planar beam wavefront shape for departures from non-planarity. Thus in this particular case no additional wavefront shaping means, apart from the need to provide an incident collimated beam, is required. Ideally the incident beam will fall at normal incidence on the object, i.e. when the object has parallel sides as in a sheet of material. A departure from normal incidence will merely deflect the final beam slightly, while not affecting its overall wavefront shape.

However, as the object shape increasingly affects the wavefront shape, the correspondingly increasing non-planarity of the beam wavefront after transmission or reflection by the object will give rise to increasing difficulty in reliably determining its shape and hence the shape of the object. In the invention this difficulty is overcome or mitigated as explained above by employing additional wavefront shaping means in the radiation path between the radiation means and the inspecting means so that the wavefront of the final beam is substantially planar, thereby enabling accurate inspection or measurements of the final beam wavefront to be made.

The form that the wavefront shaping means will take will depend on its precise function in relation to the object to be inspected and to the rest of the apparatus. In apparatus where the requirements are relatively simple, for example when using a collimated radiation source to inspect a transparent object with at least one curved surface such as a simple optical transmissive lens or a simple curved reflector such as a parabolic mirror, the wavefront shaping means may be constituted by a (relatively simple) single radiation wavefront shaping element, such as a simple optical lens (or even a curved reflector). Similarly, where the object shape departs from a laminar shape by only a relatively small, but non-negligible amount, the wavefront shaping means may be constituted by a single appropriate hologram or grating wavefront shaping element. In other circumstances, it may be necessary or desirable to use a wavefront shaping means comprising at least two wavefront shaping elements. For example, an optical lens under test may approximate a simple spherical lens, but with non-negligible specified deviations from sphericity, in which case it might be appropriate to use a relatively simple wavefront shaping element (e.g. a second lens) to deal with the major wavefront shaping aspect, and to additionally provide another wavefront shaping element such as a hologram or grating to deal with the deviations from sphericity.

Irrespective of how many elements it contains the wavefront shaping means may lie between the radiation source and the object, or between the object and the inspecting means. Furthermore, where the wavefront shaping means comprises more than one radiation element, it is also possible to have the elements distributed along the radiation path between the radiation source and the inspecting means so that at least one lies between the radiation source and the object and the remainder between the object and the inspecting means; all that is necessary is that the final beam incident on the wavefront inspecting means is generally planar.

Preferably the wavefront shaping means is traversed once by the radiation as it passes from the radiation source to the inspecting means.

However it is equally possible for the wavefront shaping means, or at least one element thereof to be arranged so as to be traversed more than once (preferably no more than twice, and preferably once as radiation passes from the source to the object and once as the radiation passes from the object to the inspecting means) as it passes from the radiation source to the inspecting means. Plural traverses of the wavefront shaping means, or at least one element thereof, may occur if the object itself acts as a reflector. Alternatively, apparatus according to the invention may additionally comprise at least one reflective element arranged so as to obtain plural traverses of the wavefront shaping means and/or the object to be inspected. If appropriate, a beamsplitter may be employed to separate the reflected beam for transmission to the inspecting means.

Where the radiation is collimated prior to incidence on the wavefront shaping means, then on the grounds of reverse ray tracing the shaping means may have the same form irrespective of whether it is placed between the object and the radiation source or between the object and the inspecting means. Nevertheless, in general, the exact form of the wavefront shaping means will be dependent upon its position in, and the overall geometry of, the apparatus.

Similarly, it is preferred that the object is arranged so that a single reflection or transmission of the radiation beam occurs. Of course, in some instances, for example a mirror with a rear reflective surface, then it will be impossible to avoid a double traverse of the overlying transmissive material, which may contribute to the overall distortion of the final wavefront. Nevertheless, arrangements of apparatus in which plural traverses of transparent objects and/or plural reflections from reflective surfaces also fall within the scope of the invention.

Where the apparatus is set up for testing one particular type of object with a specified shape, the apparatus may provide a predetermined location therefor. However, the apparatus may include means for adjusting the position of the object to be inspected relative to the rest of the apparatus. This may be useful for example when a surface (e.g. of a lens or reflector) under test is specified as having a part spherical surface but the radius is not known, as will be described in more detail below.

The radiation beam may be of any known form, for example acoustic, radio, microwave, x-ray, but in a preferred form of the invention it is optical, i.e. in the IR to UV wavebands, and preferably in the visible or IR band. For ease of reference visible optical beams will be assumed from now on. However, the radiation is selected to suit the task in hand, and for inspecting the curvature of a single face of a optical lens transmissive in the visible, for example, it may be possible to select a different wavelength, e.g. in the infra-red, where the light is reflected. Conversely, visible light may be used to inspect by reflection a single face of an infra-red lens.

The detector means will preferably operate at the wavelength of the radiation beam. Preferably, the detector means of the inspecting means comprises a pixelated imaging photosensor. For example, the detector means may comprises a charge coupled device (CCD) array or a CCD camera. Alternatively, the detector means may comprise a plurality of detector elements (e.g. two or more discrete photosensors).

Any type of object may be so measured. However, one important application of the invention is to the measurement of optical components, such as windows, plane mirrors, and transmissive and reflective lenses (e.g. optical lenses for use in the IR, visible and/or UV ranges).

The inspecting means may provide a qualitative output, i.e. provide an output which has one value when the wavefront planarity or collimation of the final beam is within acceptable limits (however determined), and a different output if not. This may be regarded as indicative of whether or not the shape of the object (surface) is acceptably close to the specified shape. In such cases, the limits will be determined by the intended use of the object.

Thus the inspecting means may be any known arrangement for determining the degree of collimation. For example the final beam could be split into two parts, and the beams inspected at respective different distances from the object and compared. Such comparison could be effected by allowing the beams to be incident on respective like imaging photosensors, subtracting the resulting intensity signals pixelwise to give the modulus of the local intensity difference and integrating over the imaged area. The degree of planarity or collimation may then be subjected to a judging means (for example a simple thresholding circuit) for indicating whether or not the object shape is sufficiently close to the specified shape.

This type of approach falls within the broad scope of the invention. However, while being useful and having the virtue of simplicity, it fails to identify precisely how the actual shape departs from the specified shape. There will be situations where some modes of departure have a significant effect on the performance of the component or object, so that tight tolerances in respect thereof need to be adopted, whereas other modes of departure have little effect and should therefore be associated with rather less rigid tolerances. It follows that with the simple approach there is a quandary in setting tolerance levels. Either tight tolerances are set, leading to the possible rejection of some objects which would perform satisfactorily, or tolerances are slackened so that potentially some unsatisfactory objects are accepted.

Accordingly in preferred embodiments of the present invention the inspecting means includes means for analysing the shape, or components of the shape, of the wavefront of the final radiation beam. This analysis may provide a measurement of the amplitude of one or more different wavefront modes contributing to the wavefront shape, for example Zernike modes, and it may be performed as in our previous aforesaid patent applications or in any other known manner. By comparison of the amplitudes of the one or more different wavefront modes with threshold values, again an indication may be obtained of whether the object shape conforms sufficiently to the specified shape. Where there is insufficient conformity, the associated mode may be identified, to enable corrective action (possibly automatic) to be taken if appropriate, for example during the course of manufacture of a large mirror with a complex surface shape.

Insofar as some embodiments of the invention are capable or rendering a very precise quantitative measurement of how the wavefront departs from planarity, and hence a very precise indication of how the actual and specified shapes differ, the invention is well suited to effecting measurements on precision objects such as the aforesaid optical components.

According to a further aspect of the invention, apparatus is provided for indicating the departure of a shape of an object from a specified shape, the apparatus comprising radiation means for directing an incident beam of radiation onto the object, and inspecting means for inspecting the final beam after transmission by or reflection from said object, wherein the apparatus is arranged so that the final beam will have a substantially planar wavefront when said object has said specified shape, and said inspecting means is arranged to determine any departure of the wavefront of the final beam from planarity characterised in that said incident beam of radiation directed onto the object by the radiation means has a non-spherical wavefront. Preferably, said incident beam of radiation directed onto the object by the radiation means has a substantially planar wavefront.

The invention extends to a method of indicating the departure of a shape of an object from a specified shape, the method including the steps of directing an incident beam of radiation onto the object so that that a final beam following transmission by or reflection from said object would have a planar wavefront if the object has said specified shape, and inspecting the final beam from the object for any departure of its wavefront from planarity. The method is characterised by the step of inspecting the final beam comprising the step of splitting the final beam into two or more beams and directing said two or more beams to laterally displaced locations on detector.

According to a further aspect of the invention, a method of indicating the departure of a shape of an object from a specified shape is provided, the method including the steps of directing an incident beam of radiation onto the object so that that a final beam following transmission by or reflection from said object would have a planar wavefront if the object has said specified shape, and inspecting the final beam for any departure of its wavefront from planarity, characterised in that the step of directing an incident beam of radiation onto the object comprises the step of directing a beam of radiation having a non-spherical (e.g. substantially planar) wavefront.

Figure 2:
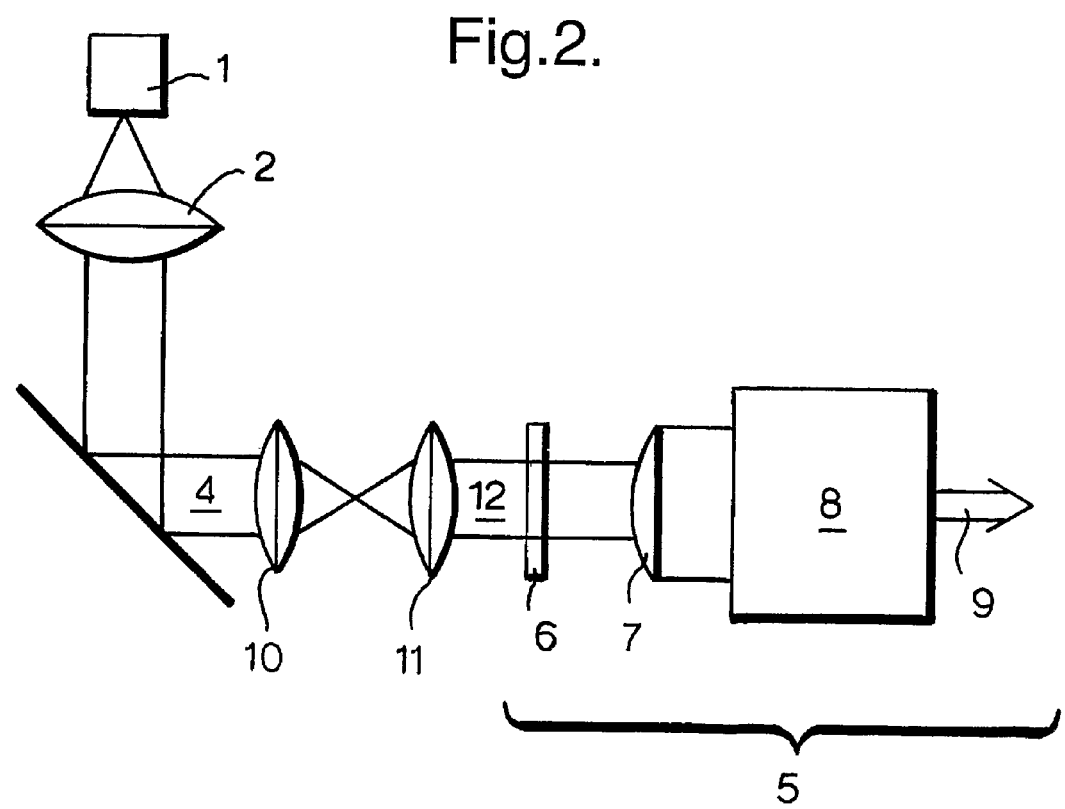
Figure 3:
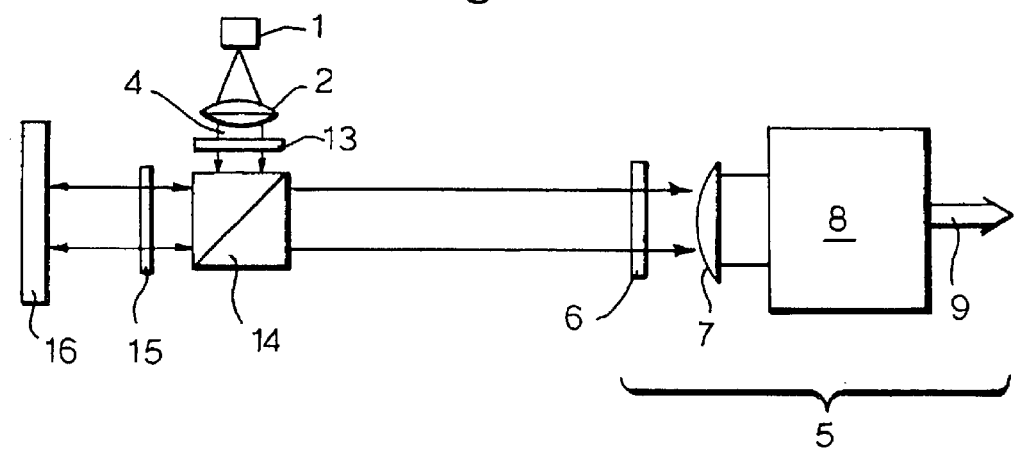
Figure 4:
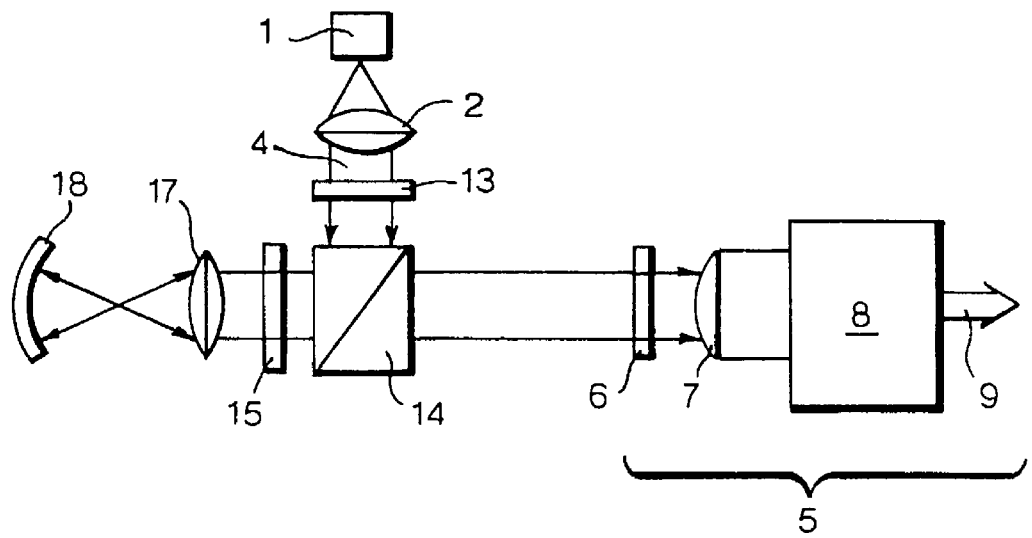
Figure 5:
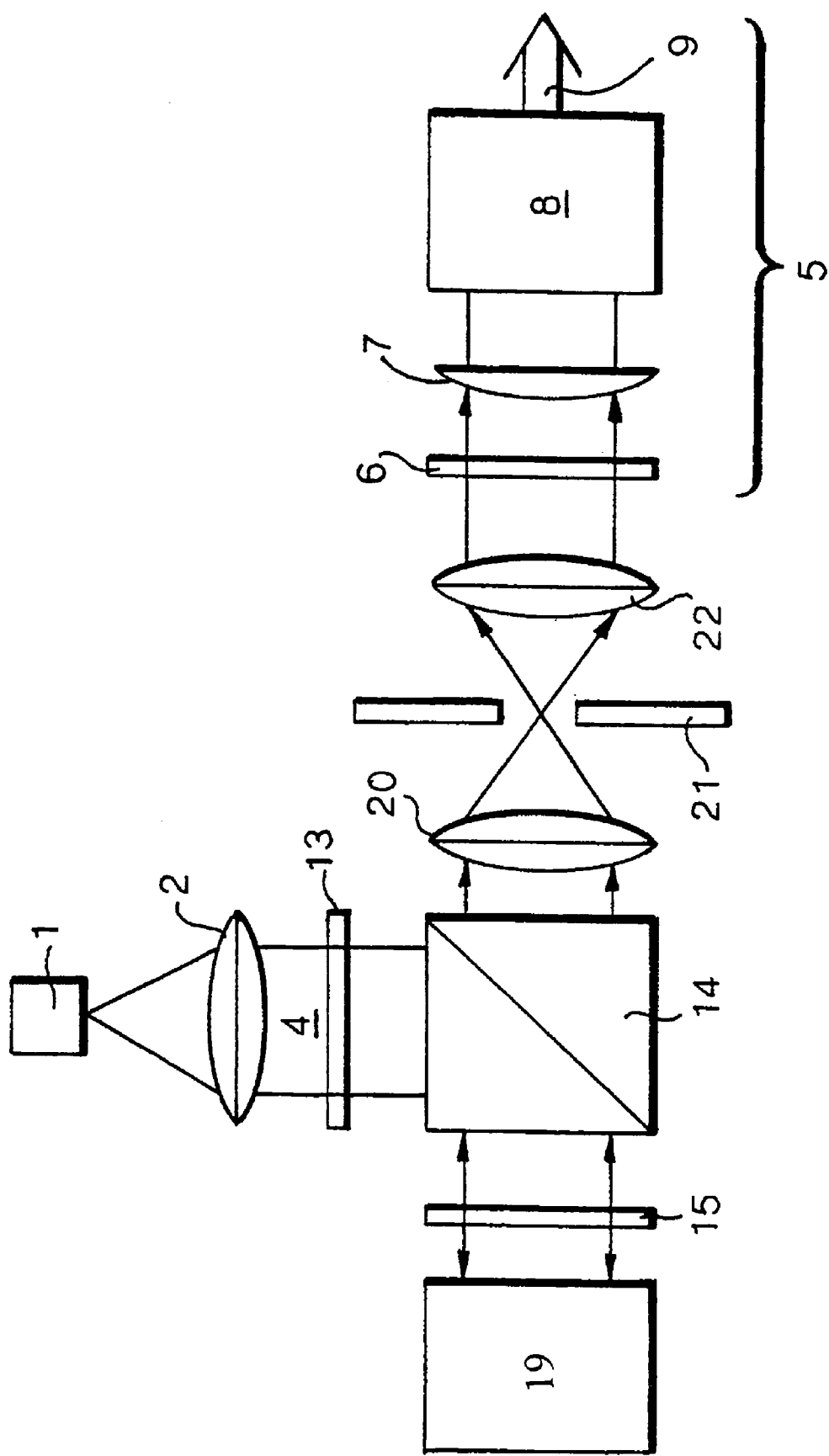
Figure 6:
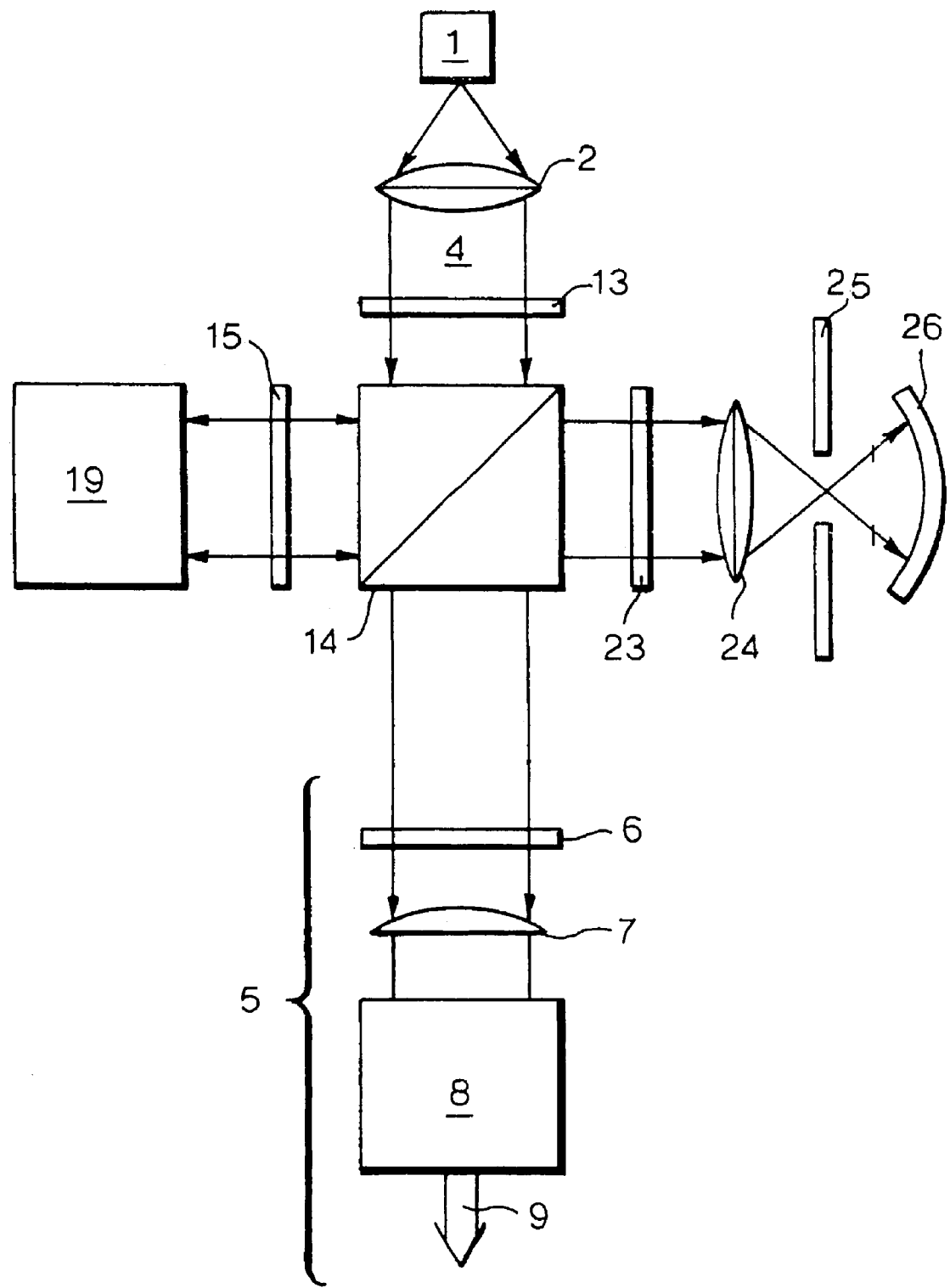
Figure 7:
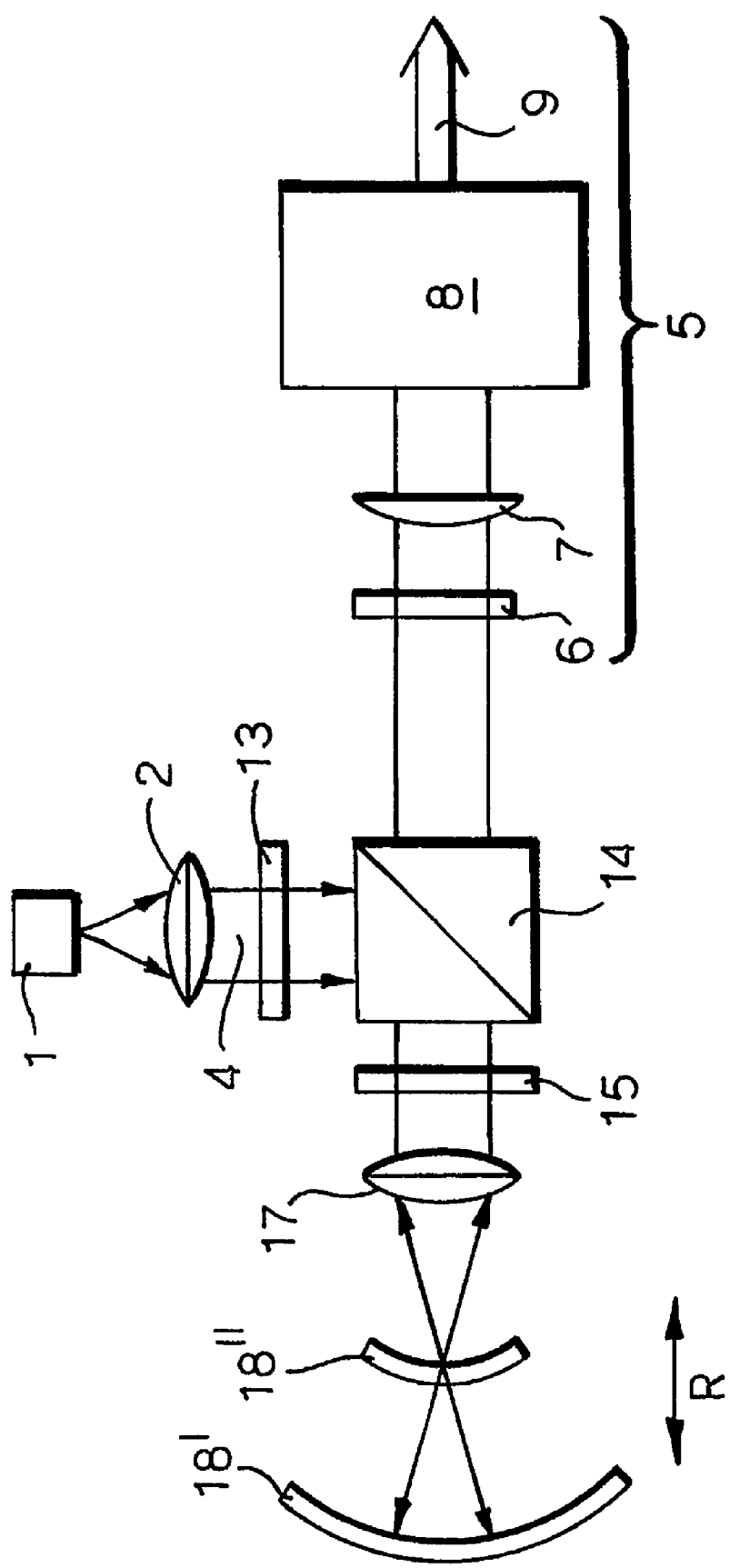

Further features and advantages of the invention will become apparent upon a perusal of the appended claims, to which the reader is referred, and upon a reading of the following more detailed description of the invention, made principally with respect to optical components and with reference to the accompanying drawings, in which:

FIG. 1 schematically shows a first embodiment of apparatus according to the invention as used for inspecting a transmissive component or object in the form of a parallel sided sheet of material, e.g. a window;

FIG. 2 schematically shows a second embodiment of apparatus according to the invention as used for inspecting a transmissive component or object having significant focussing power, such as a surface of a simple bi-convex lens;

FIG. 3 schematically shows a third embodiment of apparatus according to the invention as used for inspecting a reflective component or object in the form of a planar sheet of material, such as a simple mirror or a semiconductor wafer with a front reflecting surface;

FIG. 4 schematically shows a fourth embodiment of apparatus according to the invention as used for inspecting a simple curved front reflective surface of an object such as a curved mirror;

FIG. 5 schematically shows a fifth embodiment of apparatus according to the invention as used for inspecting an advanced lens where the surface has a complex curvature;

FIG. 6 schematically shows a sixth embodiment of apparatus according to the invention as used for inspecting a reflective surface having a complex curvature;

FIG. 7 schematically shows a modification of the embodiment of FIG. 4 as used for inspecting a curved mirror where the curvature of the surface is initially unknown; and Each of the embodiments of FIGS. 1 to 7 includes a wavefront inspecting means 5 which could be in the form of a wavefront sensor such as described in our copending International Patent Application No. PCT/GB03/00964 or our copending International Patent Application No. WO04/068090. However, as particularly shown in outline, inspecting means 5 is of the form described in our copending International Patent Application No. PCT/GB03/00979 and comprises (inter alia) a quadratically distorted grating 6 for directing light transmitted through the sheet 3 onto the lens 7 of a CCD camera 8 providing an output signal 9 for further processing as outlined in the aforesaid application. Ideally beam 4 falls at normal incidence on the sheet 3.

As described in the aforesaid application, this combination of elements produces laterally displaced spots on the pixel-wise imaging photosensor surface of camera 8 which correspond respectively to the zero, +1 and −1 diffraction orders from grating 6. Since the photosensor is located at the focal point of lens 7, the central zero order diffraction beam is brought to accurate focus on the sensor surface when the beam incident on the grating 6 is generally collimated. In the latter case the spots for the +1 and −1 orders are equally and slightly out of focus before and after the sensor surface (and so of equal size, which feature may be utilised to ensure correct positioning of the optical components of the arrangement, i.e. so that the beam incident of grating 6 is generally collimated) and contain information on departures of the received wavefront from perfect planarity. These departures may be conveniently measured as coefficients of various Zernike modes (or other orthogonal functions), which may then be translated into shape components in the surface or shape of the object to be inspected, e.g. the sheet 3 in the case of FIG. 1.

The output of the inspecting means 5 may be suitably processed to provide an indication or measure of any departure of the shape of the object to be inspected from its expected shape. The processed output may provide an indication of both the presence and magnitude of underlying basic contributions to distortions in shape, for example as Zernike coefficients, and these may be used to accept or reject the object, or to further process the object to bring its shape within acceptable limits.

FIG. 1 illustrates apparatus according to the invention as used for inspecting a transmissive parallel sided sheet 3 of optical material such as a window. A light source 1 such as a laser diode and a lens 2 serve to direct a substantially collimated beam 4 through the sheet 3 to the inspecting means 5. The processed output of the inspecting means 5 will include an indication of any departure from constant thickness, inter alia.

In this particular arrangement, the sheet of material is not necessarily planar, particularly if it is relatively thin and the curvature is relatively small, since the change in incident angle across the sheet (for example a flexible sheet of material deformed into a curve, or a rigid curved sheet) and the resulting change in optical (radiation) thickness will be negligible and will not contribute to any optical (focussing) power. This may not apply for thicker curved sheets which would be expected to have some form of negative focussing power insofar as the optical thickness at the sheet edges will be greater, in which case it might be necessary to employ a different or additional wavefront shaping means as described in later embodiments.

One potential use of this arrangement is for measuring significant deformations in plastic sheets such as are used in mobile phone windows for example, or for measuring thickness variations in glass sheets, in order to assess acceptability.

In the embodiment of FIG. 1, no additional wavefront shaping means is required apart from the lens 2 for providing a collimated beam.

Where the nominal sheet thickness has a known and significant variation, it is possible to insert an additional wavefront shaping means to compensate therefor to maintain collimation of the beam incident on grating 6. This additional collimating means could take the form of a hologram or grating, and it may either be a passive means such as a predetermined grating, or for example a spatial light modulating means which can be controlled to give the required effect. The additional collimating means may be located between the lens 2 and grating 6, either before or after the sheet 3 so long as it introduces the requisite compensation for the nominal thickness variation.

In the embodiment of FIG. 2 the collimated light beam 4 is transmitted via a first lens 10 of known properties and a lens 11 under test to the inspecting means 5. The lens 10 is arranged so that in conjunction with lens 11 it provides a collimated light beam 12 for transmission to the grating 6 if lens 11 has its nominal shape. As particularly shown, the lenses 10, 11 are arranged as in a optical relay, and the correct relative positioning of the two lens may be confirmed by equality of size in the plus and minus one order diffracted spots at the camera sensor. It should be clear that the order of lenses 10, 11 may be reversed.

Any deviation of the lens 11 from its nominal shape will produce non-planar components in the wavefront of beam 12 which can be detected after processing of the output 9 of the camera 8. From these components can be derived the type of deviation in the shape of the lens 11. In this embodiment the lens provides a wavefront shaping means in addition to the collimating lens 2. An additional wavefront shaping means such as a hologram or diffraction grating may be employed as in FIG. 1 to compensate for any known and significant nominal departures in the shape of the lens from a simple lens, and one arrangement thereof is shown in FIG. 5 to be described later.

In FIG. 3, the collimated beam 4 is transmitted via a polariser 13 to a polarising beam splitter where it is reflected through a quarter wave plate 15 towards the reflective surface of a nominally planar semiconductor wafer 16 under test. Light reflected from the surface of the wafer 16 and transmitted again through the plate 15 is now transmitted through the splitter 14 towards the grating 6. Again the processed output 9 will give an indication of non-planarity of the wavefront incident on grating 6 and hence an indication of non-planarity of the surface of wafer 16.

FIG. 4 illustrates apparatus similar to that of FIG. 3 but with substitution of the wafer 16 by a curved reflector 18, and with a lens 17 of known properties between the quarter wave plate 15 and the reflector 18. The lens 17 is arranged so that in conjunction with a reflector of nominal shape the wavefront incident on grating 6 is planar. Any deviations in wavefront planarity as indicated by suitable processing of the output 9 give corresponding indications of deviations in the shape of the reflector 18 from its nominal shape.

FIG. 5 shows an embodiment of apparatus adapted for use with more complex surfaces or shapes. The collimated beam 4 is transmitted via the polariser 13 for reflection by the splitter 14 through the quarter wave plate 15 to a reflective spatial light modulator 19 acting as a hologram or diffraction grating for modifying its originally planar wavefront. The modified reflected beam is retransmitted through the plate 15 and splitter 14, a lens 20 of known properties and a pinhole aperture 21 to a lens 22 under test, the lens 22 having a complex nominal shape. Together the lens 20 and the modulator 19 are arranged so that in conjunction with lens 22 a collimated beam with planar wavefront should be incident on the grating 6. Again, any deviation from planarity, as indicated by processing of the output 9 indicates a departure of the shape of lens 22 from its nominal shape. The pinhole serves to select one of the plus and minus one orders of diffraction from the modulator 19.

FIG. 6 is an arrangement similar to that of FIG. 5, but arranged for testing a curved reflector 26 having a complex shape. Linearly polarised light after transmission through splitter 14 encounters a second quarter wave plate 23, and then a lens 24 having known properties. Light transmitted by the lens 24 and an aperture 25 is incident on the reflector 26, reflected light therefore being transmitted back via aperture 25, lens 24 and plate 23 for reflection by splitter 14 towards the grating 6. The lens 24 and modulator 19 are arranged so that together with a reflector 26 of nominal shape, the wavefront of the light incident on the inspecting means 5 is planar, and deviations therefore as indicated by processing of the output 9 being indicative of deviations from nominal shape in the reflector 26.

The embodiment of FIG. 7 includes means for permitting movement of the mirror 18 along the main optical axis of the apparatus. In this way it is possible to deal with a mirror having a surface with an unknown curvature. In use, the mirror 18 is moved along the axis to first and second positions 18' and 18" where the wavefront impinging on the grating 6 is planar, as shown by the fact that the sizes of the spots at the camera sensor from the plus one and minus one diffraction orders are equal. The position 18' corresponds to the position shown in FIG. 4, in which the area of the beam incident on the mirror 18 is relatively large, preferably covering substantially all of the area of the mirror, or at least the area where the surface shape is of most concern. However, in the position 18" the beam from the lens 17 is brought to a focus on the mirror 18 and hence covers the minimum area. While this is of no practical use in detecting shape defects, the relation between the two positions can be used to provide a measure of the radius of curvature of the mirror surface, as is known in the prior art. In a variation, the mirror 18 is held in a fixed position while the lens 17 is moved.

The invention claimed is:

1. Apparatus for indicating the departure of a shape of an object from a specified shape, the apparatus comprising:
   radiation means for directing an incident beam of radiation onto the object,
   inspecting means for inspecting a final beam, said object located optically between said radiation means and said inspecting means
   at least one wavefront shaping means, optically disposed between the radiation means and the inspecting means for shaping the final beam to have a substantially planar wavefront when said object has said specified shape, and said final beam comprises a beam which has been both transmitted by or reflected from said object and shaped by said wavefront shaping means, said at least one wavefront shaping means is arranged to compensate for non-planarity introduced by said object having said specified shape, and said inspecting means is arranged to determine any departure of the wavefront of the final beam from planarity, wherein said inspecting means comprises:
   beamsplitting means for splitting the final beam into two or more diffracted beams and for directing said two or more beams to laterally displaced locations; and
   detector means for detecting radiation intensity of said two or more beams on the detector means.

2. Apparatus according to claim 1 wherein said radiation means is arranged to produce a collimated beam of radiation.

3. Apparatus according to claim 1 wherein said incident beam of radiation is optical radiation.

4. Apparatus according to claim 1 wherein at least one said wavefront shaping means is located between the radiation means and the object.

5. Apparatus according to claim 1 wherein at least one said wavefront shaping means is located between the object and the inspecting means.

6. Apparatus according to claim 1 wherein at least one said wavefront shaping means comprises a lens or curved reflector.

7. Apparatus according to claim 1 wherein at least one said wavefront shaping means comprises a diffraction grating or hologram.

8. Apparatus according to claim 1 wherein at least one said wavefront shaping means is provided by a spatial light modulator.

9. Apparatus according to claim 1 including means for adjusting the relative position of the object and a said wavefront shaping means.

10. Apparatus according to claim 1 comprising a beam splitter between said radiation means and said inspecting means.

11. Apparatus according to claim 1 wherein the beamsplitting means of said inspecting means comprises at least one of a diffraction grating and hologram.

12. Apparatus according to claim 1 wherein the inspecting means is arranged to provide an analysis of the shape, or components of the shape, of the wavefront of the final beam.

13. Apparatus according to claim 1 wherein the detector means of the inspecting means comprises a pixelated imaging photosensor.

14. Apparatus according to claim 13 wherein the pixelated imaging photosensor is a charge coupled device (CCD) array.

15. A method of indicating the departure of a shape of an object from a specified shape, the method including the steps of:
   directing an incident beam of radiation onto the object;
   shaping at least one of said incident beam and a beam transmitted by or reflected from said object to compensate for non-planarity introduced by said object having said specified shape, to provide a final beam comprising a beam which has been both transmitted by or reflected from said object and shaped by said shaping step, said final beam having a planar wavefront if the object has said specified shape; and
   inspecting the final beam for any departure of its wavefront from planarity, wherein the step of inspecting said final beam comprises the steps of:
   splitting the final beam into two or more diffracted beams; and
   directing said two or more beams to laterally displaced locations on a detector.

16. A method according to claim 15 wherein said object is an optical component.

17. A method according to claim 16 wherein said optical component is a window or is of generally laminar form, or comprises a planar reflective surface.

18. Apparatus for indicating the departure of a shape of an object from a specified shape, the apparatus comprising:
   a radiation source for directing an incident beam of radiation onto the object;
   a beam inspecting device for inspecting a final beam, wherein said final beam comprises a beam which has been both transmitted by or reflected from said object and shaped by at least one wavefront shaping device, said object located optically between said radiation source and said inspecting device;

said at least one wavefront shaping device, optically disposed between the radiation source and the inspecting device, for shaping the final beam to have a substantially planar wavefront when said object has said specified shape, said at least one wavefront shaping device is arranged to compensate for non-planarity introduced by said object having said specified shape, and said inspecting device is arranged to determine any departure of the wavefront of the final beam from planarity, wherein said inspecting device comprises:

a diffraction device for splitting the final beam into two or more beams and for directing said two or more beams to laterally displaced locations; and a photosensor for detecting radiation intensity of said two or more diffracted beams at said laterally displaced locations.

* * * * *